US008792459B2

(12) United States Patent
Patil et al.

(10) Patent No.: US 8,792,459 B2
(45) Date of Patent: Jul. 29, 2014

(54) METHODS AND APPARATUS FOR JOINT SCHEDULING OF PEER-TO-PEER LINKS AND WIRELESS WIDE AREA NETWORK LINKS IN CELLULAR NETWORKS

(75) Inventors: Shailesh Patil, Bridgewater, NJ (US); Hua Wang, Bridgewater, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 12/898,923

(22) Filed: Oct. 6, 2010

(65) Prior Publication Data
US 2012/0087347 A1 Apr. 12, 2012

(51) Int. Cl.
*H04J 3/00* (2006.01)
(52) U.S. Cl.
USPC ............................ 370/336; 370/329; 709/205
(58) Field of Classification Search
USPC .................................... 370/329, 336; 709/205
See application file for complete search history.

(56) References Cited

U.S. PATENT DOCUMENTS

| 6,034,950 | A | * | 3/2000 | Sauer et al. | 370/310.2 |
| 6,052,594 | A | * | 4/2000 | Chuang et al. | 455/450 |
| 6,807,165 | B2 | * | 10/2004 | Belcea | 370/347 |
| 7,336,638 | B2 | * | 2/2008 | Cheng et al. | 370/338 |
| 7,881,340 | B2 | * | 2/2011 | Farrag et al. | 370/468 |
| 8,249,032 | B2 | * | 8/2012 | Jamadagni et al. | 370/336 |
| 2004/0266339 | A1 | * | 12/2004 | Larsson | 455/7 |
| 2005/0135295 | A1 | * | 6/2005 | Walton et al. | 370/328 |
| 2009/0046653 | A1 | * | 2/2009 | Singh et al. | 370/330 |
| 2010/0118701 | A1 | | 5/2010 | Li et al. | |

(Continued)

FOREIGN PATENT DOCUMENTS

| EP | 2012443 A2 | 1/2009 | |
| WO | 2009009572 A2 | 1/2009 | |
| WO | 2009058084 A1 | 5/2009 | |
| WO | WO 2009058084 A1 * | 5/2009 | ............ H04W 28/10 |

OTHER PUBLICATIONS

Wongthavarawat and Ganz, "Packet scheduling for QoS support in IEEE 802.16 broadband wireless access systems", International Journal of Communication Systems, Multimedia Networks Laboratory, pp. 81-96, 2003. Electrical and Computer Engineering Department, University of Massachusetts, Amherst, MA 01003, U.S.A.

(Continued)

*Primary Examiner* — Hassan Kizou
*Assistant Examiner* — Deepa Belur
(74) *Attorney, Agent, or Firm* — James K. O'Hare

(57) ABSTRACT

A wireless device, a method, and a computer program product in a wireless device are provided in which a scheduling control signal is received in peer-to-peer resources. In addition, whether to yield a data transmission is determined based on the received scheduling control signal. Furthermore, the data transmission is sent to a base station on the peer-to-peer resources upon determining not to yield the data transmission. A base station, a method, and a computer program product in a base station are also provided in which a scheduling control signal is received in peer-to-peer resources. In addition, whether to yield a data transmission is determined based on the received scheduling control signal. Furthermore, the data transmission is sent to a wireless device on the peer-to-peer resources upon determining not to yield the data transmission.

50 Claims, 16 Drawing Sheets

(56) References Cited

U.S. PATENT DOCUMENTS

| | | |
|---|---|---|
| 2010/0120372 A1 | 5/2010 | Li et al. |
| 2010/0142493 A1* | 6/2010 | Sakoda et al. ............... 370/336 |
| 2010/0142518 A1 | 6/2010 | Kubler et al. |
| 2010/0169498 A1 | 7/2010 | Palanki et al. |
| 2010/0189046 A1* | 7/2010 | Baker et al. .................. 370/329 |
| 2010/0189048 A1* | 7/2010 | Baker et al. .................. 370/329 |
| 2011/0086679 A1* | 4/2011 | Li et al. ......................... 455/572 |
| 2011/0222408 A1* | 9/2011 | Kasslin et al. ................. 370/241 |
| 2012/0039308 A1* | 2/2012 | Kim et al. ...................... 370/336 |
| 2012/0093098 A1* | 4/2012 | Charbit et al. ................. 370/329 |
| 2012/0093137 A1* | 4/2012 | Sakoda et al. ................. 370/336 |
| 2012/0120883 A1* | 5/2012 | Chen et al. ..................... 370/329 |
| 2012/0182976 A1* | 7/2012 | Thoukydides et al. ........ 370/336 |
| 2012/0263137 A1* | 10/2012 | Walton et al. ................. 370/329 |
| 2012/0281683 A1* | 11/2012 | Falconetti et al. ............ 370/336 |
| 2012/0294209 A1* | 11/2012 | Periyalwar et al. ........... 370/280 |
| 2012/0300666 A1* | 11/2012 | Jang et al. ..................... 370/252 |
| 2012/0300735 A1* | 11/2012 | Kim et al. ...................... 370/329 |
| 2013/0294438 A1* | 11/2013 | Ji et al. .......................... 370/350 |

OTHER PUBLICATIONS

International Search Report and Written Opinion—PCT/US2011/054814—ISA/EPO—Jan. 27, 2012.

* cited by examiner

METHODS AND APPARATUS FOR JOINT SCHEDULING OF PEER-TO-PEER LINKS AND WIRELESS WIDE AREA NETWORK LINKS IN CELLULAR NETWORKS

BACKGROUND

1. Field

The present disclosure relates generally to communication systems, and more particularly, to joint scheduling of peer-to-peer links and wireless wide area network links in cellular networks.

2. Background

In wireless wide area network (WWAN) communication, communication between wireless devices and a serving base station are through uplink (UL) and downlink (DL) channels. In order to reduce a load on the serving base station, two wireless devices in communication with each other through the serving base station may communicate directly using peer-to-peer communication rather than communicate through the serving base station. Time/frequency resources may be dedicated for each of WWAN and peer-to-peer communication. There is a need for improving the efficiency of concurrent WWAN and peer-to-peer communication in order to better utilize the available resources.

SUMMARY

In an aspect of the disclosure, a wireless device, a method, a computer program product in a wireless device are provided in which a scheduling control signal is received in peer-to-peer resources. In addition, whether to yield a data transmission is determined based on the received scheduling control signal. Furthermore, the data transmission is sent to a base station on the peer-to-peer resources upon determining not to yield the data transmission.

In an aspect of the disclosure, a base station, a method, and a computer program product in a base station are provided in which a scheduling control signal is received in peer-to-peer resources. In addition, whether to yield a data transmission is determined based on the received scheduling control signal. Furthermore, the data transmission is sent to a wireless device on the peer-to-peer resources upon determining not to yield the data transmission.

In an aspect of the disclosure, a wireless device, a method, and a computer program product in a wireless device are provided in which a DL grant is received from a base station on WWAN resources orthogonal to peer-to-peer resources. The DL grant indicates that a data transmission can be sent to the wireless device using the peer-to-peer resources. In addition, the data transmission is received from the base station on the peer-to-peer resources.

DETAILED DESCRIPTION

Figure 1:
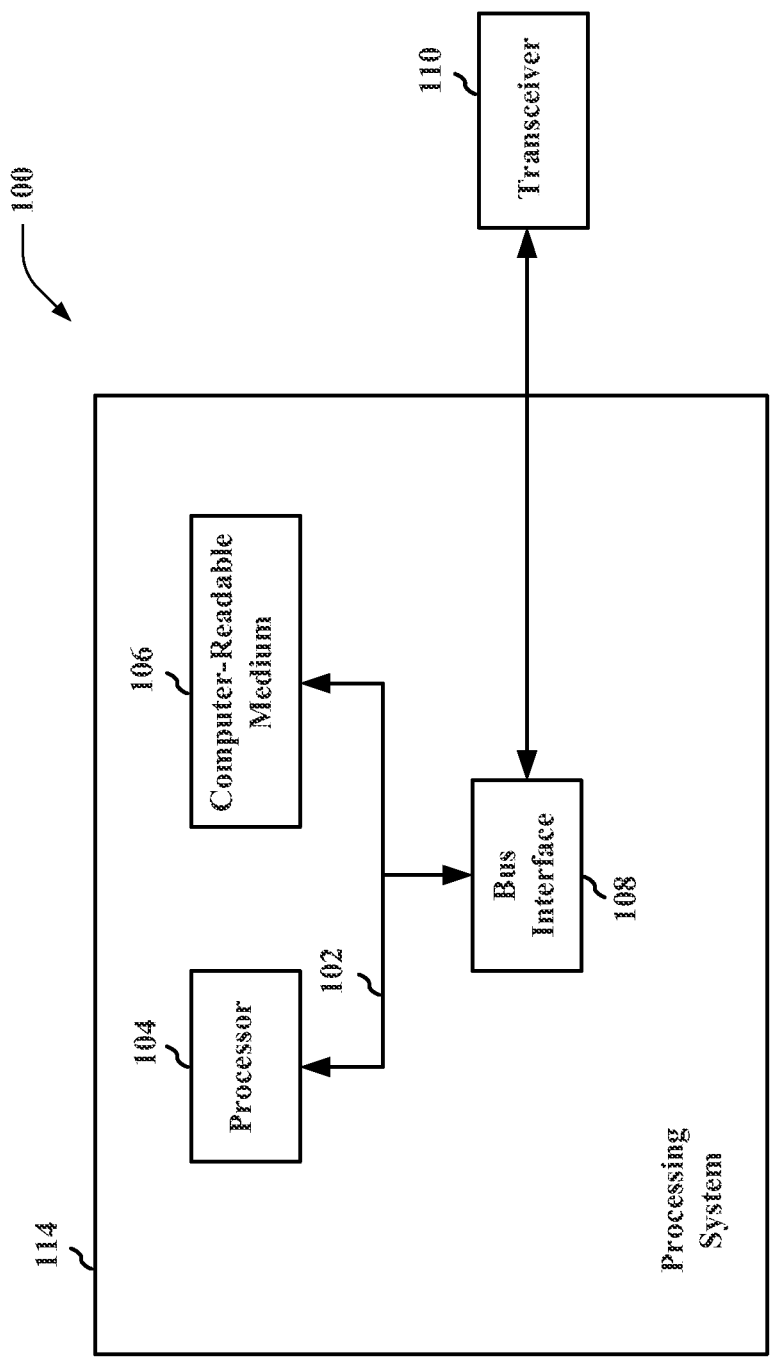
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
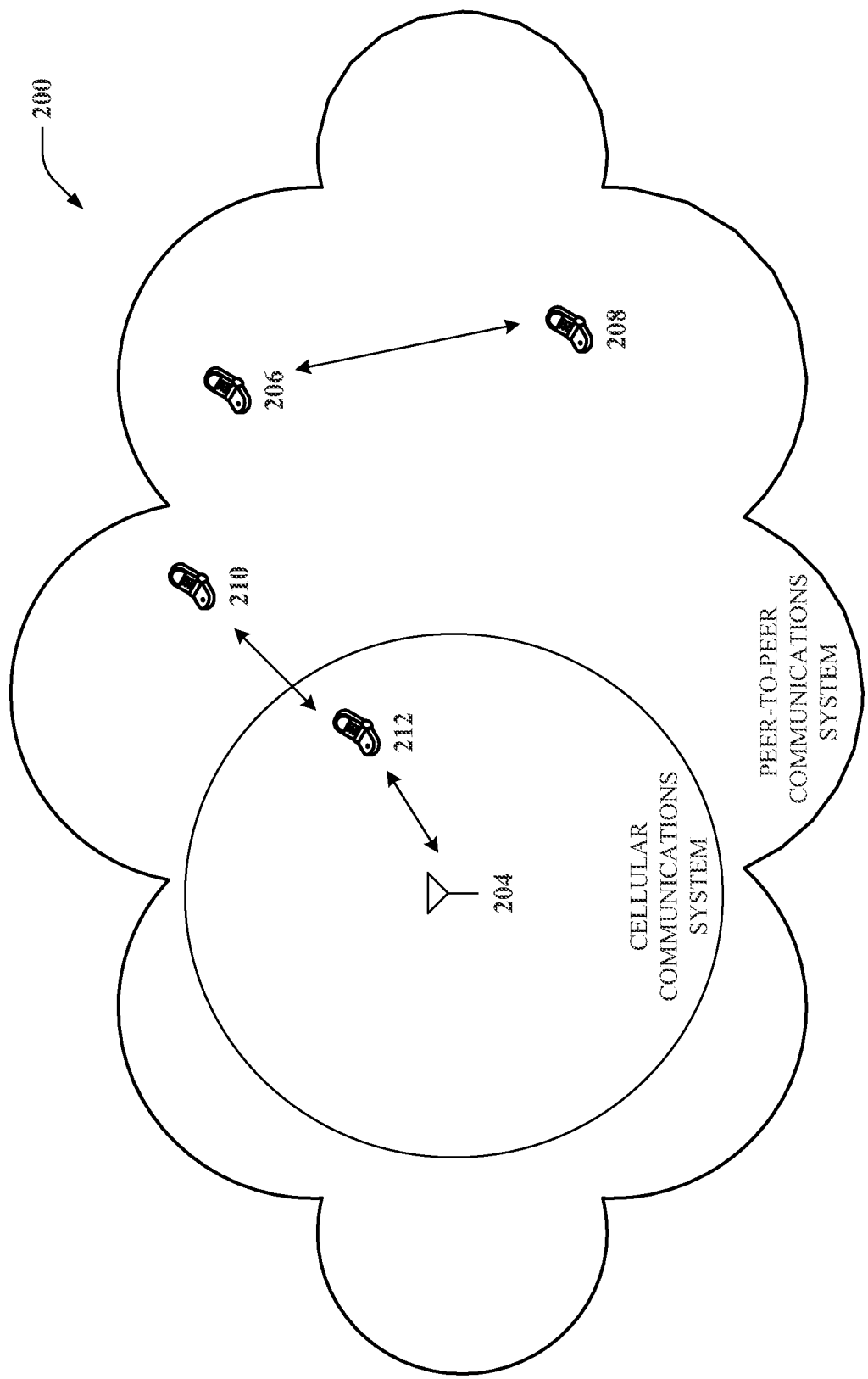
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a WWAN. Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
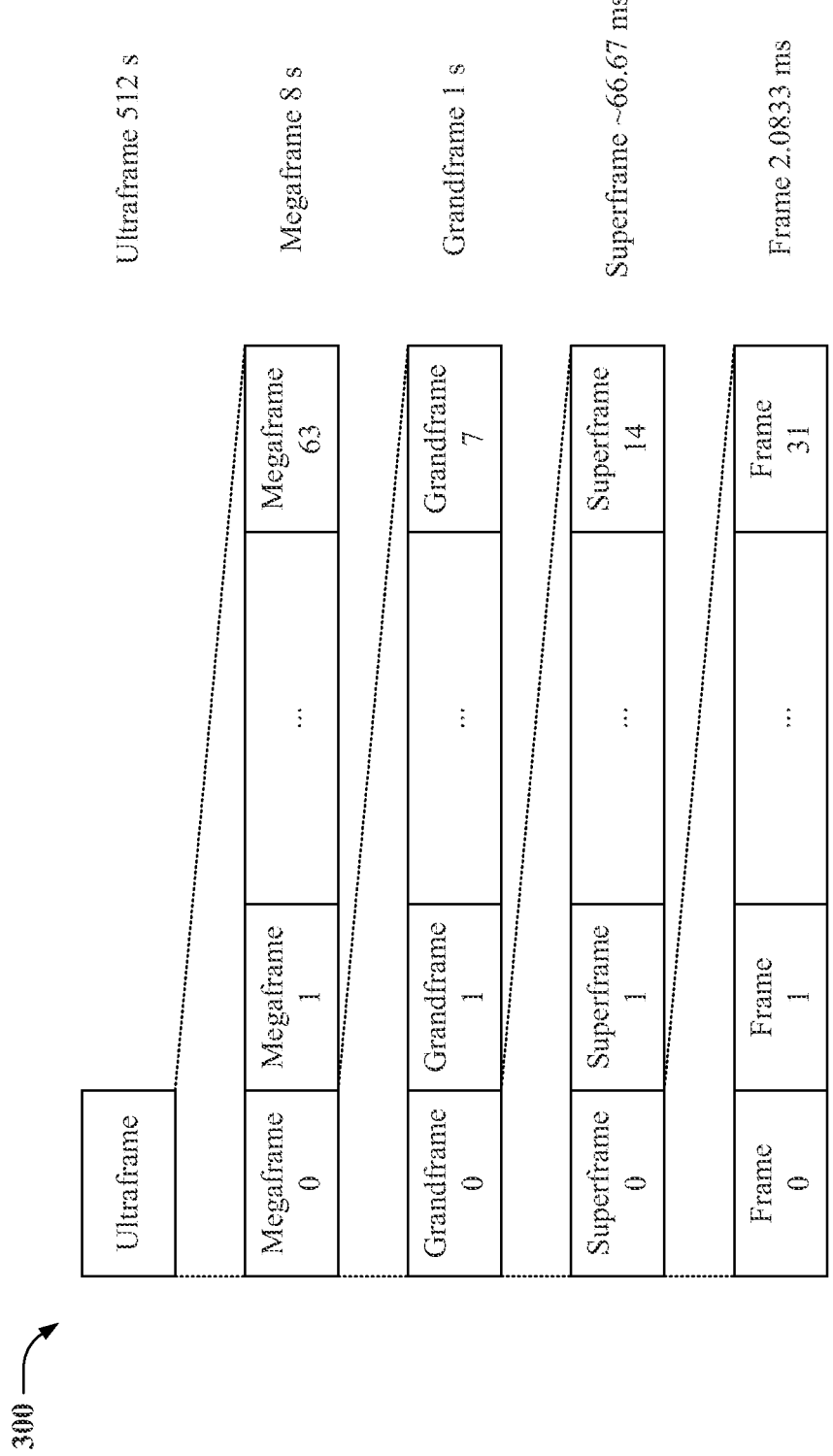
FIG. 3 is a diagram illustrating a time structure for peer-to-peer communication between the wireless devices.

FIG. 3 is a diagram 300 illustrating a time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
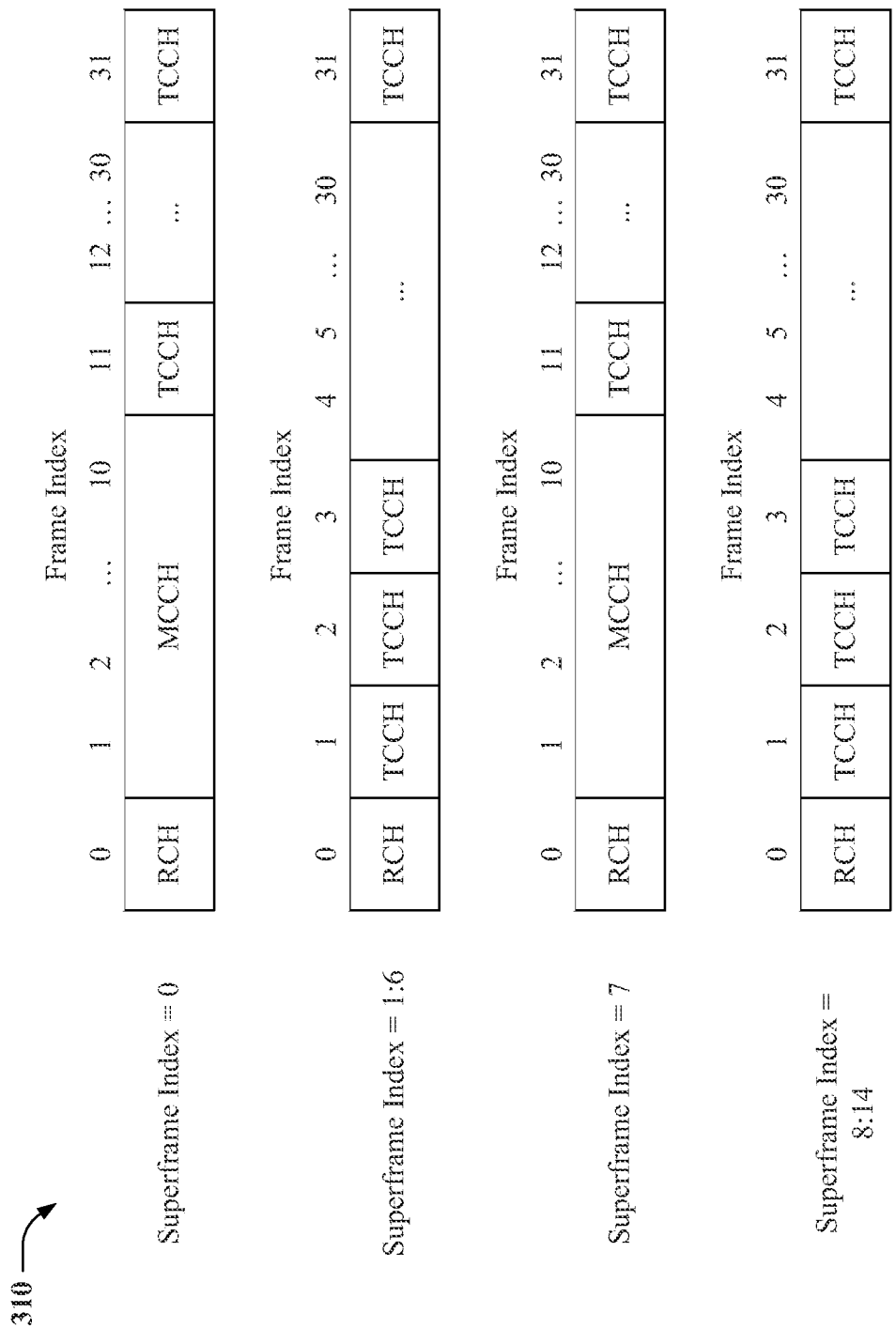
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
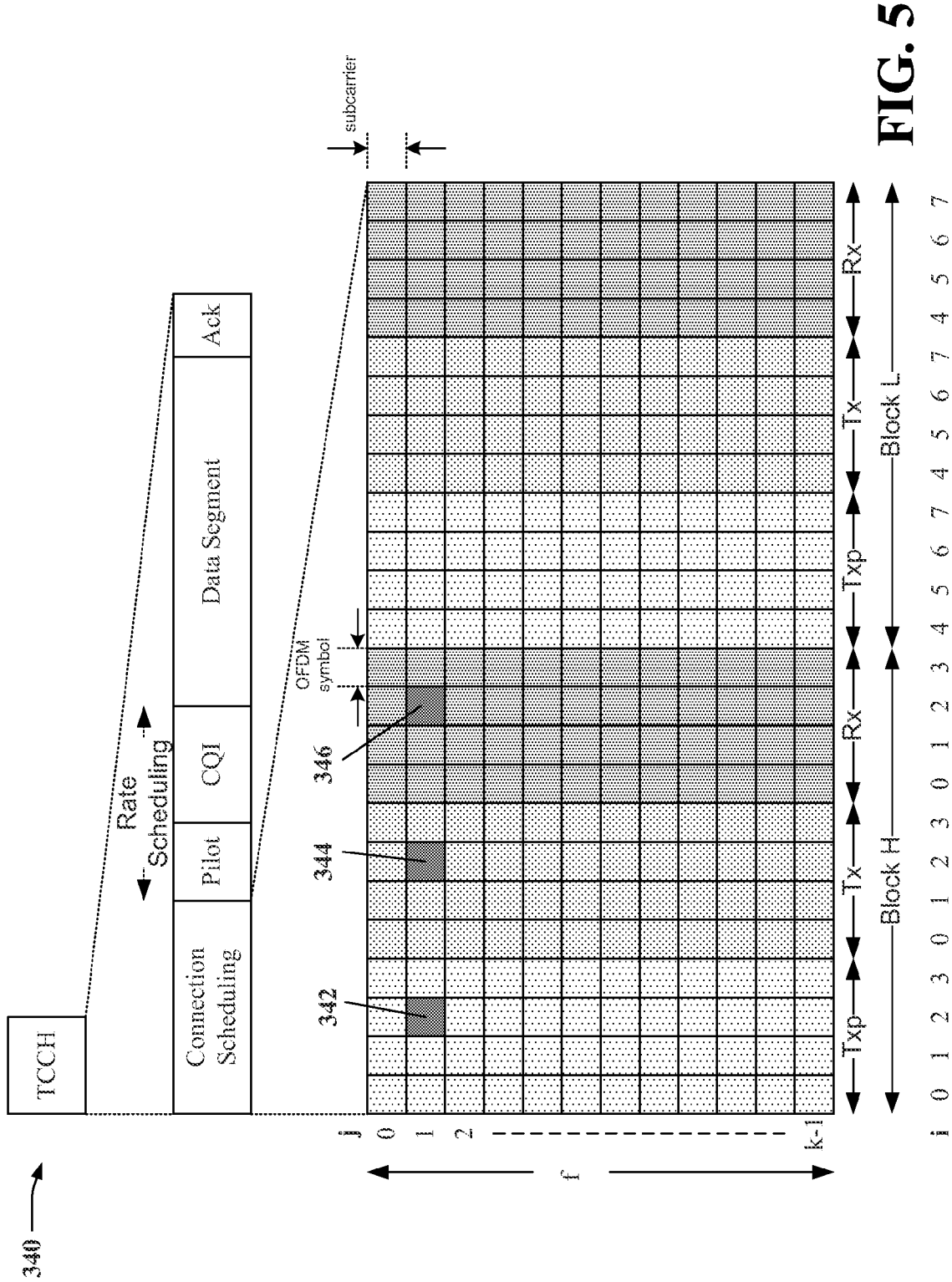
FIG. 5 is a diagram illustrating an operation timeline of a traffic channel slot and a structure of connection scheduling.

FIG. 5 is a diagram 340 illustrating an operation timeline of a TCCH slot and a structure of connection scheduling. As shown in FIG. 5, a TCCH slot includes four subchannels: connection scheduling, rate scheduling, data segment, and ACK. The rate scheduling subchannel includes a pilot segment and a CQI segment. The ACK subchannel is for transmitting an ACK or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a connection identifier (CID). Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 6:
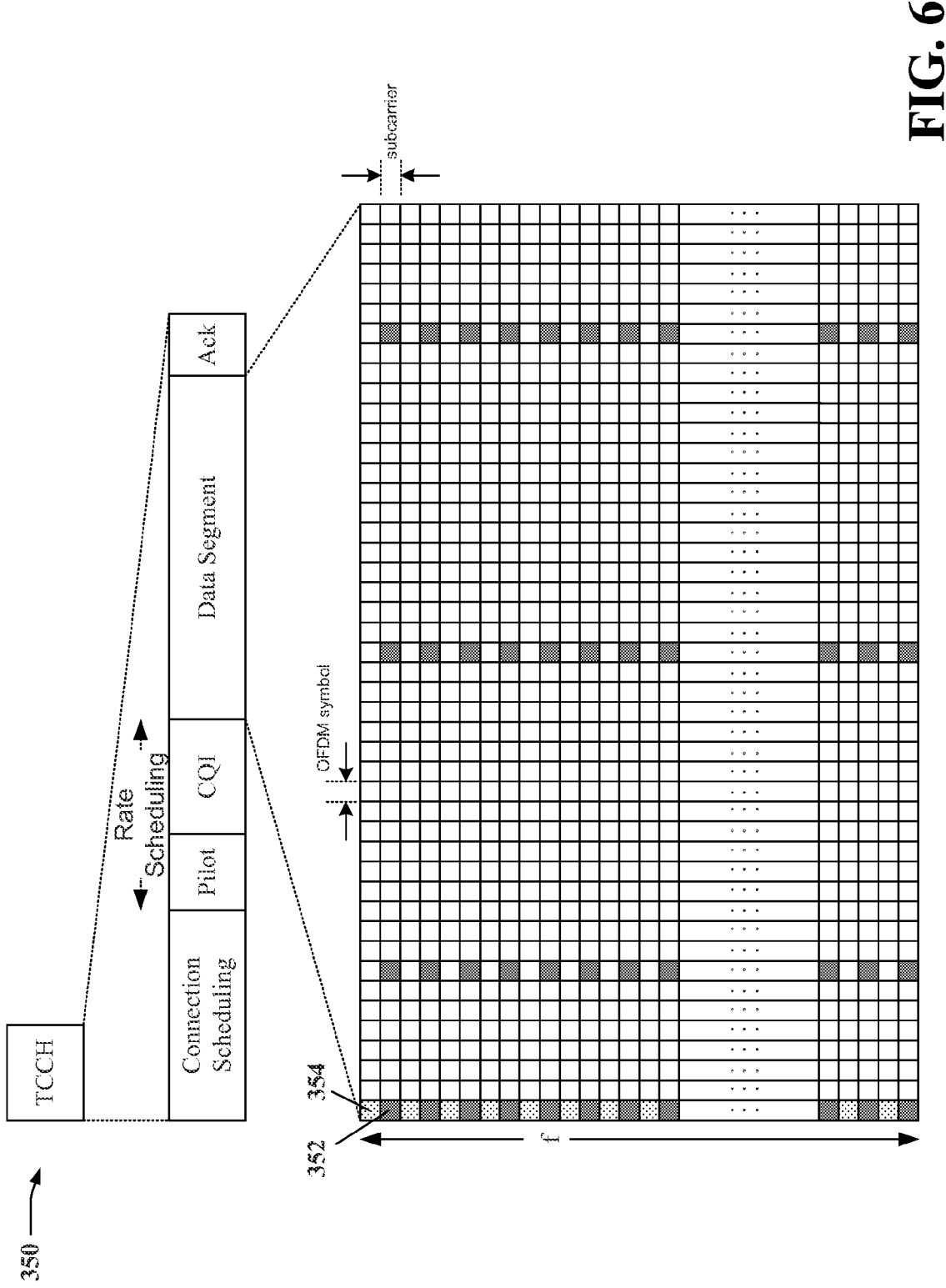
FIG. 6 is a diagram illustrating a structure of a data segment.

FIG. 6 is a diagram 350 illustrating a structure of the data segment. The data segment contains a plurality of resource elements spanning a plurality of subcarriers in the frequency domain and OFDM symbols in the time domain. Some of the resource elements in the data segment, such as resource element 354, may carry rate indicator information regarding the coding and/or modulation used for the data segment. Other resource elements in the data segment, such as resource element 352, may carry a pilot to allow for estimating the channel for demodulation and decoding.

Figure 7B:
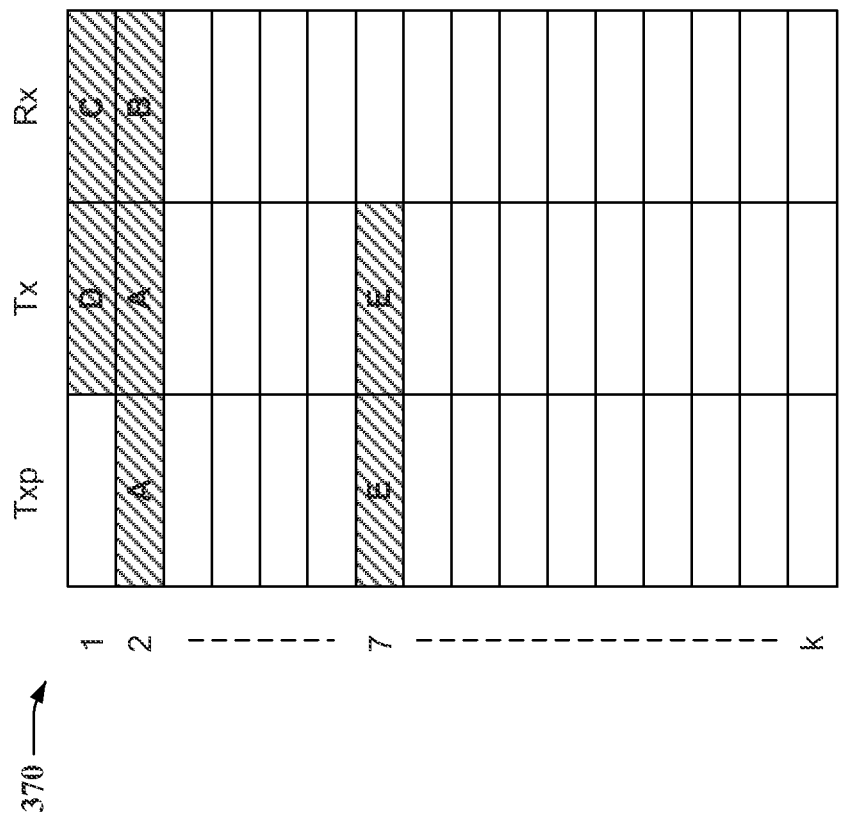
FIG. 7B is a second diagram for illustrating a connection scheduling signaling scheme for the wireless devices.
Figure 7A:
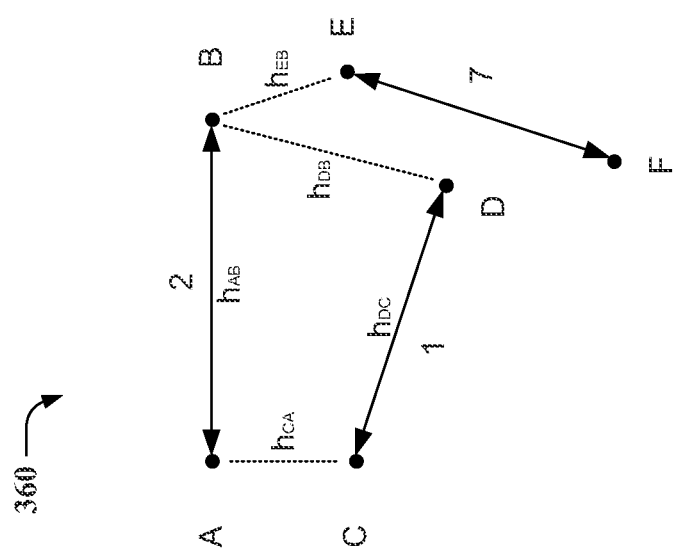
FIG. 7A is a first diagram for illustrating a connection scheduling signaling scheme for the wireless devices.

FIG. 7A is a first diagram 360 for illustrating an exemplary connection scheduling signaling scheme for the wireless devices 100. As shown in FIG. 7A, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 7B is a second diagram 370 for illustrating an exemplary connection scheduling signaling scheme for the wireless devices 100. FIG. 7B shows connection scheduling resources of first respective OFDM symbols (i=0, see FIG. 5) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the pathloss between the node A and the node B. The node B receives the transmit request signal from the node D with a power equal to $P_D|h_{DB}|^2$, where $h_{DB}$ is the pathloss between the node D and the node B. The node B receives the transmit request signal from the node E with a power equal to $P_E|h_{EB}|^2$, where $h_{EB}$ is the pathloss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable signal to interference ratio (SIR) if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the pathloss between the node D and the node C, and K is a constant known to all nodes. The node A receives the transmit request response signal from the node C at a power equal to $K|h_{CA}|^2/P_D|h_{DC}|^2$, where $h_{CA}$ is the pathloss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

Figure 8A:
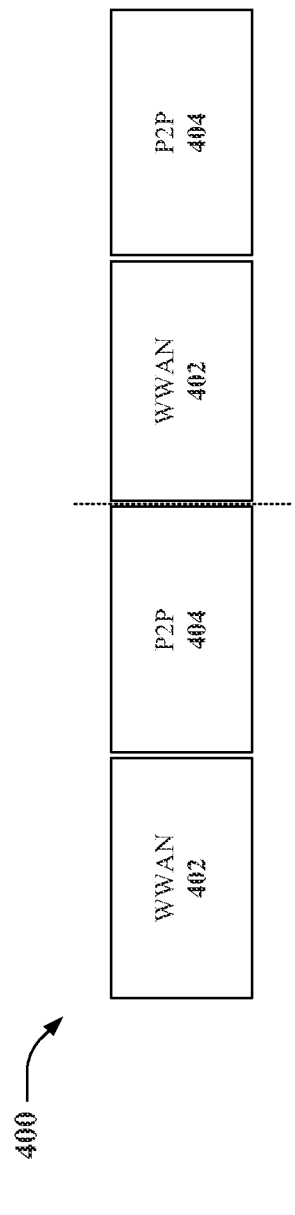
FIG. 8A is a first diagram illustrating allocated WWAN and peer-to-peer resources for wireless devices to communicate with base stations using WWAN communication and with other wireless devices using peer-to-peer communication.
Figure 8B:
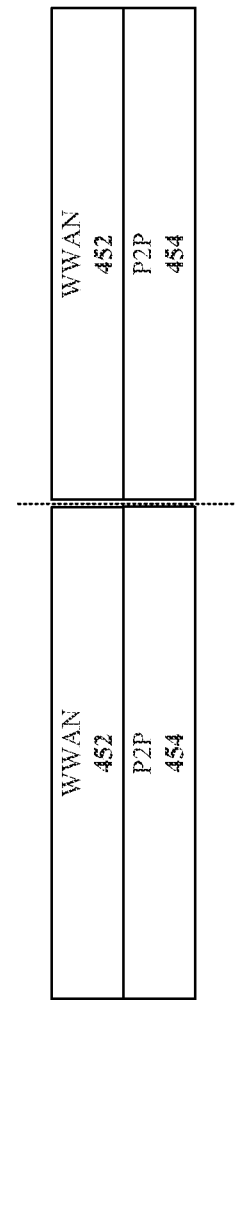
FIG. 8B is a second diagram illustrating allocated WWAN and peer-to-peer resources for wireless devices to communicate with base stations using WWAN communication and with other wireless devices using peer-to-peer communication.

FIG. 8A is a diagram 400 and FIG. 8B is a diagram 450 illustrating allocated WWAN and peer-to-peer resources for wireless devices to communicate with base stations using WWAN communication and with other wireless devices using peer-to-peer communication. As shown in FIG. 8A, periodic and orthogonal resources may be time division allocated including WWAN resources 402 and peer-to-peer resources 404. As shown in FIG. 8B, periodic and orthogonal resources may be frequency division allocated including WWAN resources 452 and peer-to-peer resources 454. The WWAN resources 402, 452 include UL and DL channels for communication between a base station and a wireless device and the peer-to-peer resources 404, 554 include the channels as discussed with respect to FIG. 4, FIG. 5, and FIG. 6 for communication between two wireless devices. Any combination of time division and frequency division allocation of the WWAN resources and the peer-to-peer resources is also possible.

Figure 9:
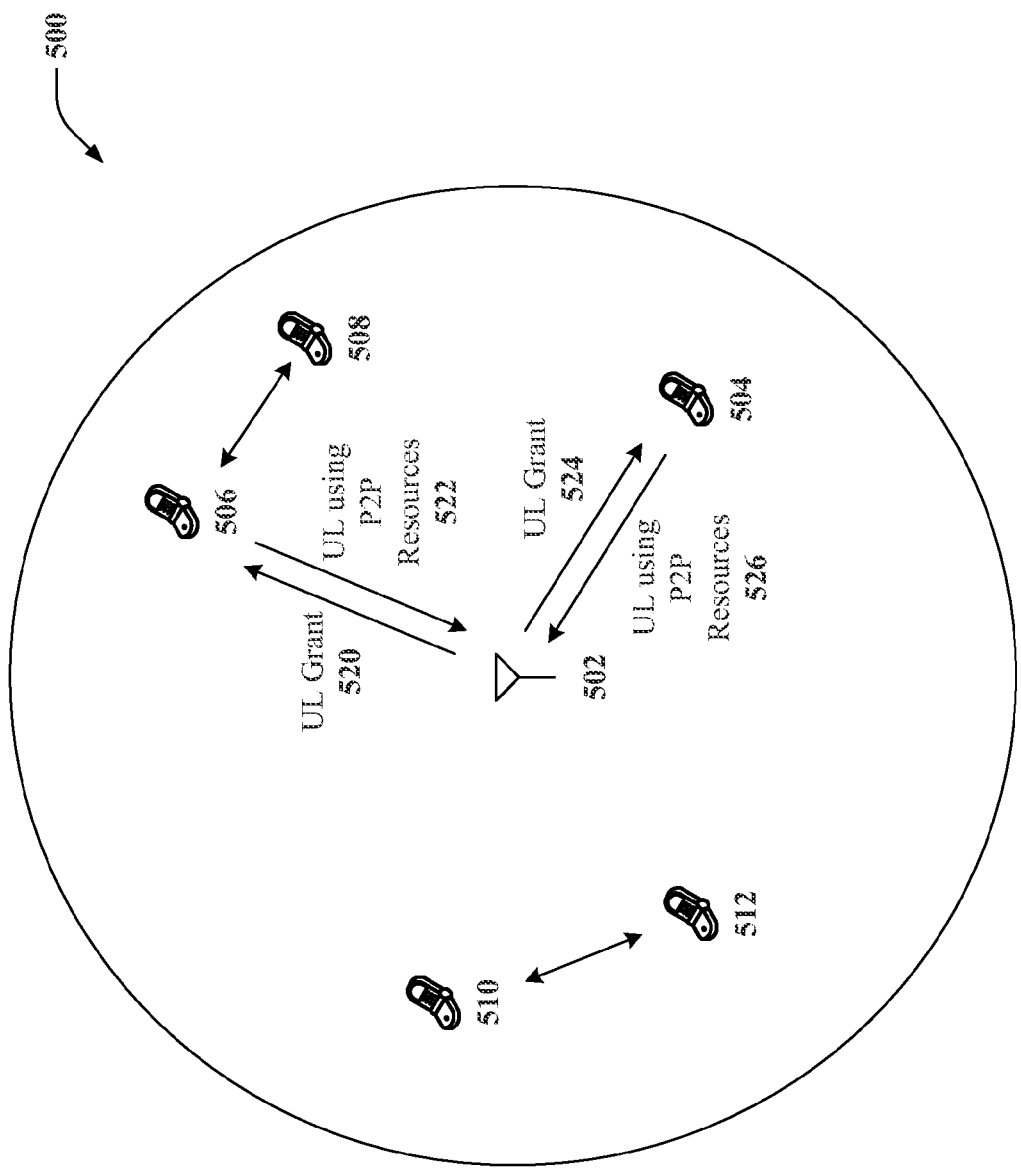
FIG. 9 is a diagram for illustrating an exemplary method.

FIG. 9 is a diagram 500 for illustrating an exemplary method. As shown in FIG. 9, the wireless devices 504, 506 are in WWAN communication with the base station 502, the wireless device 506 is in peer-to-peer communication with the wireless device 508, and the wireless devices 510, 512 are in peer-to-peer communication. According to the exemplary method, when the peer-to-peer traffic is sparse or when ongoing peer-to-peer links and a particular WWAN link do not cause too much interference to each other, the WWAN link and the peer-to-peer links may be scheduled together.

To enable peer-to-peer communication in WWAN, dedicated time/frequency peer-to-peer resources (e.g., the peer-to-peer resources 404 or the peer-to-peer resources 454) are reserved for direct peer-to-peer links communicating through peer-to-peer communication. The peer-to-peer resources contain connection scheduling resources to resolve contention between links. As discussed supra, the peer-to-peer connection scheduling resources may have a similar structure as to the connection scheduling structure described with respect to FIG. 5.

The peer-to-peer resources may be underutilized when the peer-to-peer links are not using all of the dedicated resources due to traffic burstiness. For example, the peer-to-peer resources may be underutilized when the peer-to-peer link 506, 508 and/or the peer-to-peer link 510, 512 do not use all of the peer-to-peer resources. In an exemplary configuration, to better utilize the peer-to-peer resources when the peer-to-peer resources are underutilized, the base station 502 schedules a wireless device for WWAN communication in the peer-to-peer resources. For example, as shown in FIG. 9, the base station 502 may transmit a UL grant 520 in the WWAN resources (e.g., the WWAN resources 402 or the WWAN resources 452) to the wireless device 506 and/or a UL grant 524 in the WWAN resources to the wireless device 504. The wireless device 506 may participate in connection scheduling in order to determine whether to Tx-yield the transmission. If the wireless device 506 determines not to Tx-yield the transmission, the wireless device may transmit in UL 522 to the base station 502 using the data segment of the TCCH of the peer-to-peer resources. Likewise, the wireless device 504 may participate in connection scheduling in order to determine whether to Tx-yield the transmission. If the wireless device 504 determines not to Tx-yield the transmission, the wireless device may transmit in UL 526 to the base station 502 using the data segment of the TCCH of the peer-to-peer resources.

The wireless devices 504, 506 scheduled for WWAN communication may participate in the peer-to-peer connection scheduling with a lower priority than other peer-to-peer links. As such, the wireless devices 504, 506 are not guaranteed to obtain the peer-to-peer resources 404, 454 for WWAN communication. However, even with a lower priority, the wireless devices 504, 506 may nevertheless obtain the peer-to-peer resources for WWAN communication. For example, the wireless device 506 may be able to utilize the peer-to-peer resources for WWAN communication with the base station 502 if the peer-to-peer communication traffic for the wireless link 506, 508 is inactive, the peer-to-peer link 510, 512 would not cause too much interference to the data transmission 522, and the data transmission 522 would not cause too much interference to the peer-to-peer link 510, 512. For another example, the wireless device 504 may be able to utilize the peer-to-peer resources for WWAN communication with the base station 502 if the data transmission 526 would not cause too much interference to the peer-to-peer link 510, 512 and the peer-to-peer link 506, 508, and the peer-to-peer link 510, 512 and the peer-to-peer link 506, 508 would not cause too much interference to the data transmission 526.

According to the exemplary method, the wireless device 504 receives an UL grant 524 in the WWAN resources from the base station 502. The UL grant 524 is for UL using the peer-to-peer resources. The base station 502 may schedule the wireless device 504 for UL using the peer-to-peer resources based on the location of the wireless device 504 with respect to locations of the other wireless devices 506, 508, 510, 512. For example, in order to increase the chance of a successful WWAN UL transmission, when the base station 502 determines that the wireless device 504 is sufficiently distant from the other wireless devices 506, 508, 510, 512 so as not to cause interference to the other wireless devices, the base station 502 may schedule the wireless device 504 for WWAN communication using the peer-to-peer resources.

The wireless device 504 listens to the transmit request response signals in the Rx-block transmitted by the peer-to-peer link 506, 508 and the peer-to-peer link 510, 512, and determines to Tx-yield when the device determines it would cause too much interference to the other links as discussed in relation to FIG. 7B. Otherwise, the wireless device 504 transmits data in UL 526 using the data segment of the TCCH of the peer-to-peer resources 404.

The wireless device 504 and the base station 502 may participate in the connection scheduling with a lower medium access priority than the peer-to-peer link 506, 508 and the peer-to-peer link 510, 512. With a lower medium access priority than the other peer-to-peer links, the wireless device 504 need not transmit in the Tx-block of connection scheduling. Alternatively, the wireless device 504 may participate in the connection scheduling with a higher medium access priority than the peer-to-peer link 506, 508 and/or the peer-to-peer link 510, 512. With a higher medium access priority than some of the other peer-to-peer links, other peer-to-peer links may yield to the link between the base station 502 and the wireless device 504 when the wireless device 504 actively participates in connection scheduling by transmitting in the Tx-block. The receiving wireless devices in lower priority peer-to-peer links may Rx-yield based on the transmit request signal sent in the Tx-block by the wireless device 504. When the resources are divided as shown in FIG. 8A, the base station 502 may also actively participate in connection scheduling by transmitting in the Rx-block and Rx-yielding based on whether a reasonable SIR would be expected. In such a configuration, the wireless device 504 abstains from sending the data transmission when the base station 502 Rx-yields by not sending a transmit request response signal. When the resources are divided as shown in FIG. 8B, the base station 502 may not actively participate in connection scheduling due to the half duplex nature of the base station in the UL band (i.e., not transmitting while receiving). In such a configuration, the wireless device 504 may send a data transmission in UL to the base station 502 despite not receiving a transmit request response signal from the base station 502.

As discussed supra, with respect to connection scheduling, both the wireless device 504 and the base station 502 may abstain from actively participating in connection scheduling, the wireless device 504 may actively participate alone in connection scheduling without the base station 502, or both the wireless device 504 and the base station 502 may actively participate in connection scheduling.

The rate of the UL data transmission using the peer-to-peer resources can be determined by the WWAN control channels in the WWAN resources. In addition, the scheduled wireless devices do not have to participate in the pilot and CQI message exchanges in the peer-to-peer resources. When the wireless device 504 transmits in UL 526 in the data segment of the TCCH in the peer-to-peer resources, the base station 502 decodes the message and uses the WWAN control channels in the WWAN resources to send back an ACK/NACK. The ACK/NACK mechanism may be combined for the scheduled transmissions to reduce the WWAN control channel overhead.

Figure 10:
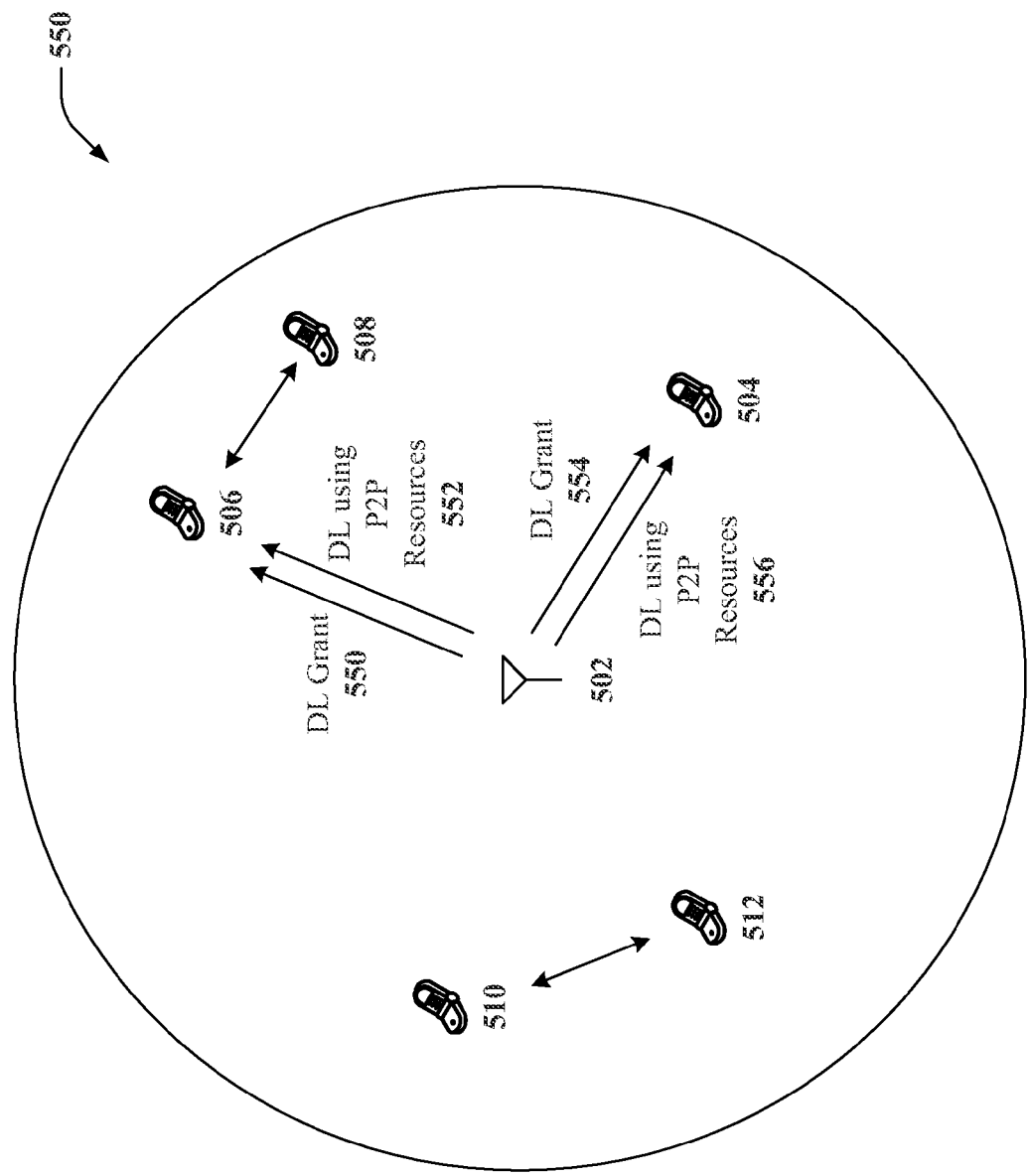
FIG. 10 is a diagram for illustrating another exemplary method.

FIG. 10 is a diagram 550 for illustrating an exemplary method. The base station 502 may send a DL grant 550 to the wireless device 506 and/or a DL grant 554 to the wireless device 504. With respect to the communication between the base station 502 and the wireless device 504, the DL grant 554 indicates to the wireless device 504 that a data transmission 556 can be sent to the wireless device 504 using peer-to-peer resources. The DL grant may further include rate information for the data transmission on the peer-to-peer resources. The base station 502 receives a scheduling control signal in peer-to-peer resources, such as for example, a transmit request response signal from the wireless device 510, the wireless device 512, the wireless device 506, and/or the wireless device 508. Based on the scheduling control signal(s), the base station 502 determines whether to Tx-yield the data transmission. If the base station determines not to Tx-yield the data transmission 556 to the wireless device 504, the base station 502 sends the data transmission 556 to the wireless device 504 on peer-to-peer resources. The base station 502 may receive ACK/NACK on WWAN resources from the wireless device 504 in response to the data transmission. The base station 502 may actively participate in connection scheduling and may therefore send a transmit request signal to the wireless device 504. When the wireless device 504 actively participates in connection scheduling and Rx-yields by not sending a transmit request response signal in response to the transmit request signal, the base station 502 abstains from sending the data transmission 556. When the wireless device 504 does not actively participate in connection scheduling, the base station 502 may send the data transmission to the wireless device 504 despite not receiving a transmit request response signal from the wireless device 504.

As discussed supra, with respect to connection scheduling, both the wireless device 504 and the base station 502 may abstain from actively participating in connection scheduling, the base station 502 may actively participate alone in connection scheduling without the wireless device 504, or both the wireless device 504 and the base station 502 may actively participate in connection scheduling.

Figure 11:
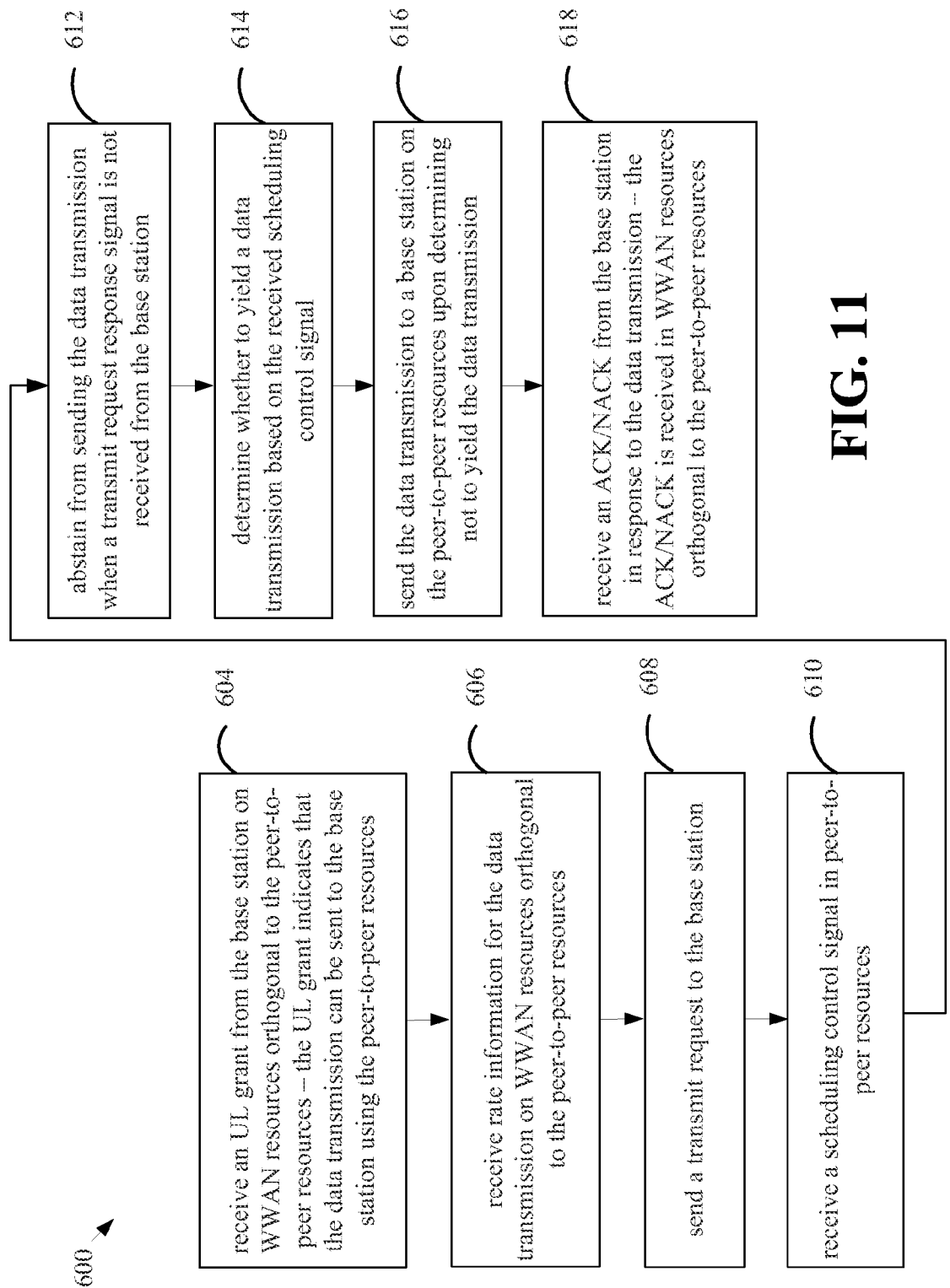
FIG. 11 is a flow chart of a method of wireless communication by a wireless device.

FIG. 11 is a flow chart 600 of an exemplary method. The method is performed by a wireless device. As shown in FIG. 11, the wireless device may receive an UL grant from the base station on WWAN resources orthogonal to the peer-to-peer resources (604). The UL grant indicates that the data transmission can be sent in UL to the base station using the peer-to-peer resources (604). The wireless device receives rate information for the data transmission on WWAN resources orthogonal to the peer-to-peer resources (606). The wireless device may actively participate in connection scheduling by sending a transmit request to the base station (608). In connection scheduling, the wireless device receives a scheduling control signal in the peer-to-peer resources (610). The scheduling control signal may be a transmit request response signal received from another wireless device other than the base station. When the base station is actively participating in connection scheduling, the wireless device may abstain from sending the data transmission when a transmit request response signal is not received from the base station (i.e., when the base station Rx-yields) in response to the transmit request (612). When the base station is not actively participating in connection scheduling, the wireless device may send the data transmission to the base station despite not receiving a transmit request response signal from the base station.

The wireless device determines whether to yield a data transmission based on the received scheduling control signal (614). That is, the wireless device may Tx-yield the data transmission based on the transmit request response signal received from another wireless device other than the base station. The wireless device sends the data transmission to a base station on the peer-to-peer resources upon determining not to yield the data transmission (616). The wireless device receives an ACK/NACK from the base station in response to the data transmission (618). The ACK/NACK is received in WWAN resources orthogonal to the peer-to-peer resources (618).

Figure 12:
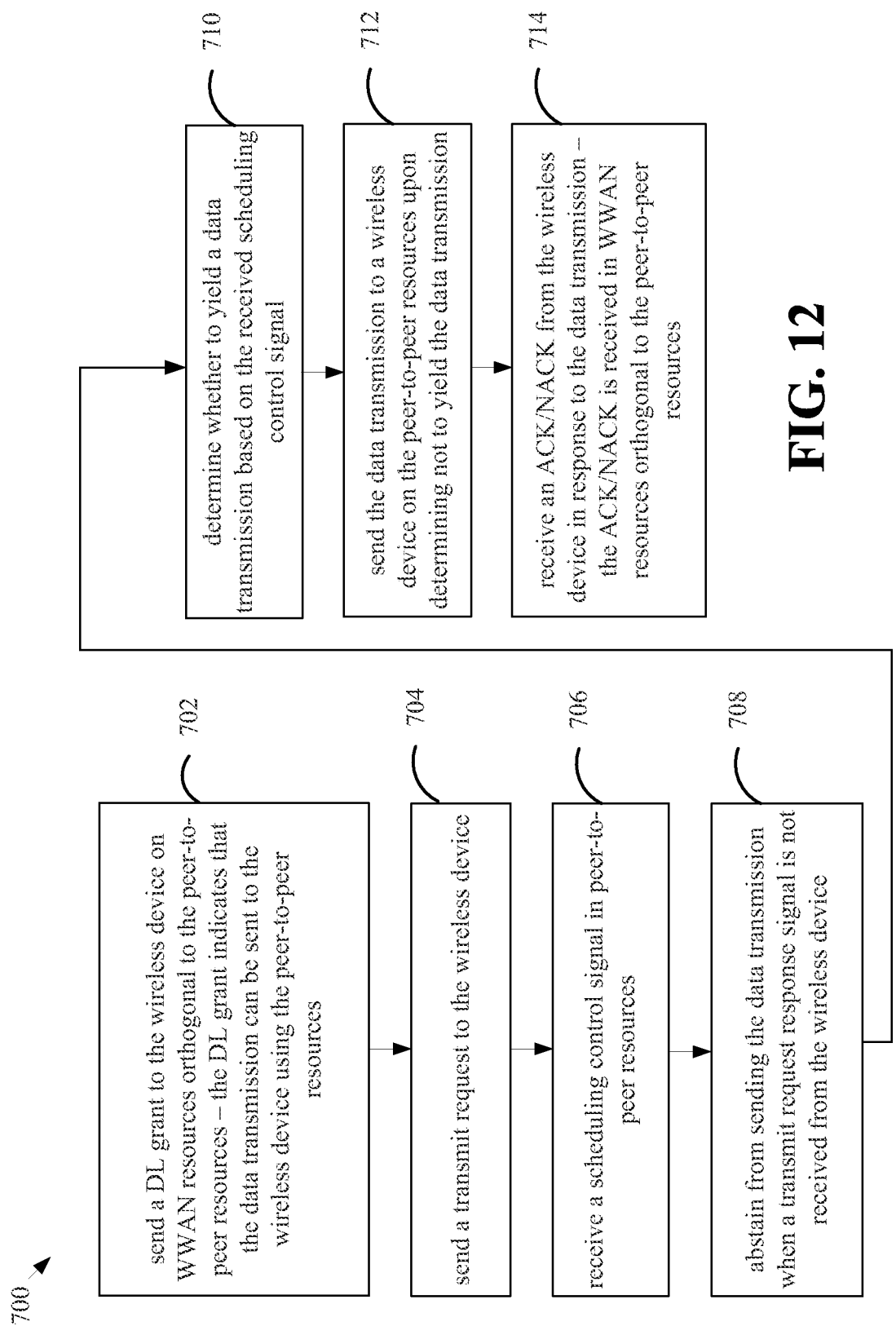
FIG. 12 is a flow chart of a method of wireless communication by a base station.

FIG. 12 is a flow chart 700 of an exemplary method. The method is performed by a base station. As shown in FIG. 12, the base station sends a DL grant to the wireless device on WWAN resources orthogonal to the peer-to-peer resources (702). The DL grant indicates that the data transmission can be sent to the wireless device using the peer-to-peer resources (702). The DL grant may include rate information for the data transmission on the peer-to-peer resources. The base station may actively participate in connection scheduling by sending a transmit request to the wireless device (704). In connection scheduling, the base station receives a scheduling control signal in peer-to-peer resources (706). The scheduling control signal may be a transmit request response signal received from another wireless device other than the wireless device. When the wireless device is actively participating in connection scheduling, the base station may abstain from sending the data transmission when a transmit request response signal is not received from the wireless device (i.e., the wireless device Rx-yields) in response to the transmit request (708). When the wireless device is not actively participating in connection scheduling, the base station may send the data transmission to the wireless device despite not receiving a transmit request response signal from the wireless device. The base station determines whether to yield a data transmission based on the received scheduling control signal (710). That is, the base station determines whether to Tx-yield a data transmission based on the transmit request response signal received from another wireless device other than the wireless device. If the base station determines not to Tx-yield the data transmission, the base station sends the data transmission to the wireless device on the peer-to-peer resources (712). The base station receives an ACK/NACK from the wireless device in response to the data transmission (714). The ACK/NACK is received in WWAN resources orthogonal to the peer-to-peer resources (714).

Figure 13:
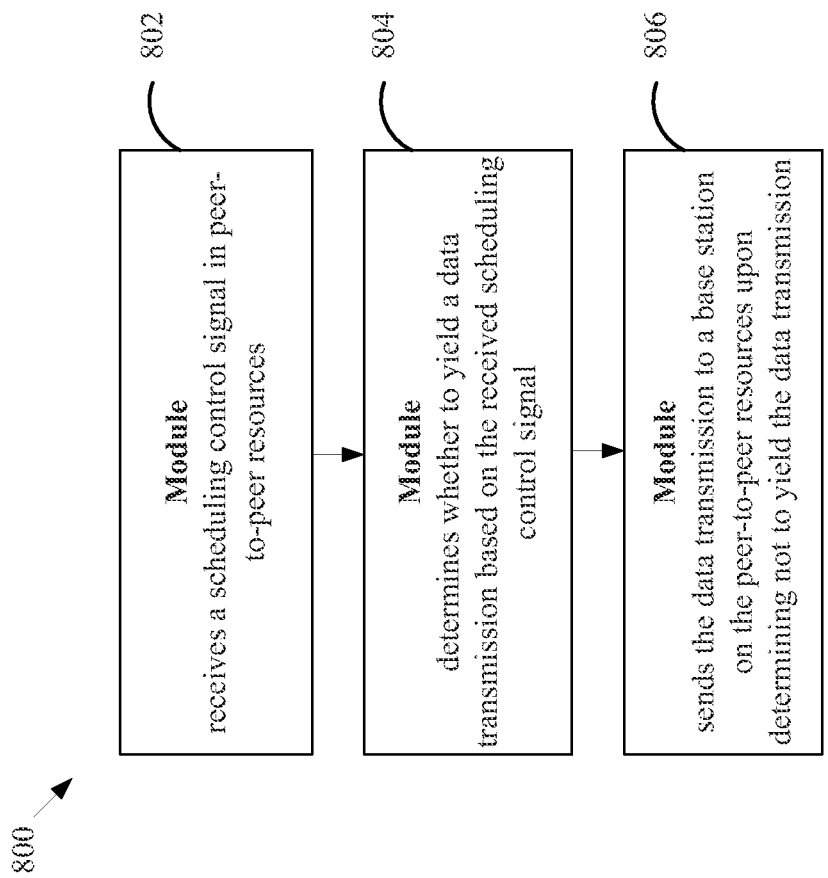
FIG. 13 is a conceptual block diagram illustrating the functionality of an exemplary apparatus.

FIG. 13 is a conceptual block diagram 800 illustrating the functionality of an exemplary apparatus 100. The apparatus 100 is a wireless device. The apparatus 100 includes a module 802 that receives a scheduling control signal in peer-to-peer resources. In addition, the apparatus 100 includes a module 804 that determines whether to yield a data transmission based on the received scheduling control signal. Furthermore, the apparatus 100 includes a module 806 that sends the data transmission to a base station on the peer-to-peer resources upon determining not to yield the data transmission.

Figure 14:
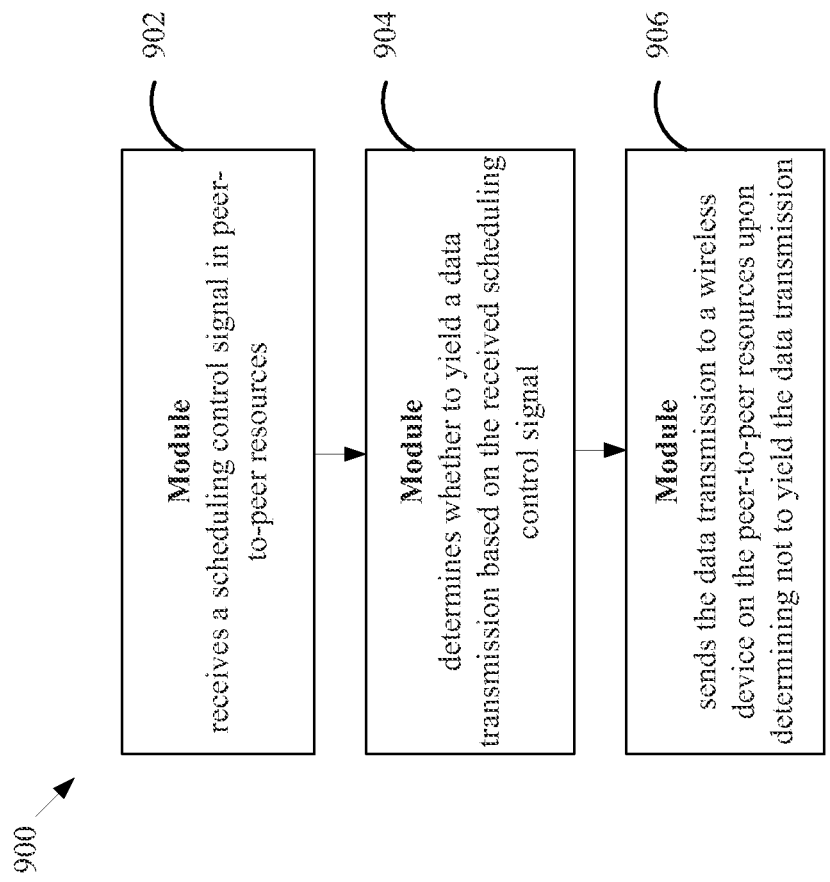
FIG. 14 is a conceptual block diagram illustrating the functionality of another exemplary apparatus.

FIG. 14 is a conceptual block diagram 900 illustrating the functionality of an exemplary apparatus 100. The apparatus 100 is a base station. The apparatus 100 includes a module 902 that receives a scheduling control signal in peer-to-peer resources. In addition, the apparatus 100 includes a module 904 that determines whether to yield a data transmission based on the received scheduling control signal. Furthermore, the apparatus 100 includes a module 906 that sends the data transmission to a wireless device on the peer-to-peer resources upon determining not to yield the data transmission.

Figure 15:
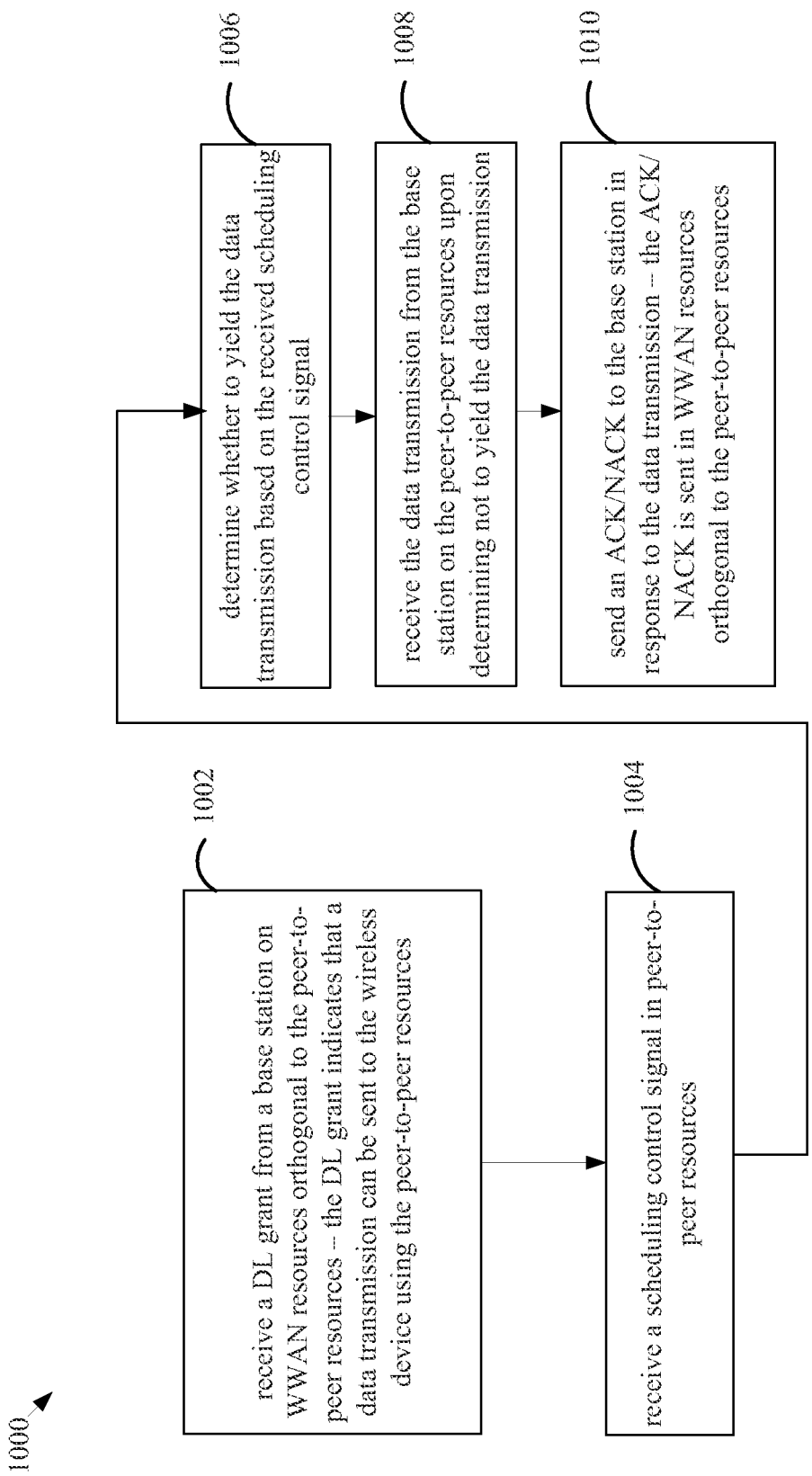
FIG. 15 is a flow chart of another method of wireless communication by a wireless device.

FIG. 15 is a flow chart 1000 of an exemplary method. The method is performed by a wireless device. As shown in FIG. 15, a wireless device receives a DL grant from a base station on WWAN resources orthogonal to peer-to-peer resources (1002). The DL grant indicates that a data transmission can be sent to the wireless device using the peer-to-peer resources (1002). The DL grant may include rate information for the data transmission on the peer-to-peer resources. When the wireless device actively participates in connection scheduling, the wireless device may receive a scheduling control signal in peer-to-peer resources (1004) and may determine whether to Rx-yield the data transmission based on the received scheduling control signal (1006). The scheduling control signal may be a transmit request signal received from another wireless device other than the base station. The wireless device Rx-yields by abstaining from sending a transmit request response signal to the base station. The wireless device receives the data transmission from the base station on the peer-to-peer resources (1008). When the wireless device actively participates in connection scheduling, the data transmission may be received from the base station on the peer-to-peer resources upon determining not to Rx-yield the data transmission. The wireless device may send an ACK/NACK to the base station in response to the data transmission (1010). The ACK/NACK is sent in WWAN resources orthogonal to the peer-to-peer resources (1010).

Figure 16:
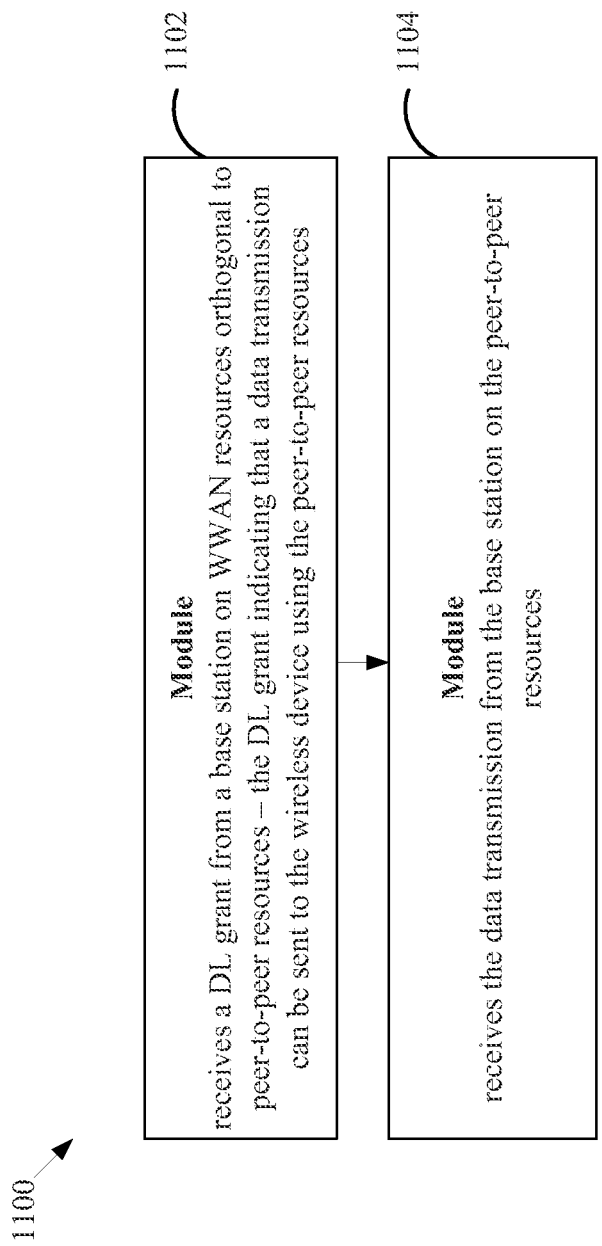
FIG. 16 is a conceptual block diagram illustrating the functionality of yet another exemplary apparatus.

FIG. 16 is a conceptual block diagram 1100 illustrating the functionality of an exemplary apparatus 100. The apparatus 100 is a wireless device. The apparatus 100 includes a module 1102 that receives a DL grant from a base station on WWAN resources orthogonal to peer-to-peer resources. The DL grant indicates that a data transmission can be sent to the wireless device using the peer-to-peer resources. In addition, the apparatus 100 includes a module 1104 that receives the data transmission from the base station on the peer-to-peer resources.

Referring to FIG. 1, in one configuration, the apparatus 100 is a wireless device and includes means for receiving a scheduling control signal in peer-to-peer resources, means for determining whether to yield a data transmission based on the received scheduling control signal, and means for sending the data transmission to a base station on the peer-to-peer resources upon determining not to yield the data transmission. In one configuration, the apparatus 100 includes means for receiving an UL grant from the base station on WWAN resources orthogonal to the peer-to-peer resources. The UL grant indicates that the data transmission can be sent to the base station using the peer-to-peer resources. In such a configuration, the apparatus 100 may further include means for receiving rate information for the data transmission on the WWAN resources orthogonal to the peer-to-peer resources. The apparatus 100 may further include means for receiving an ACK/NACK from the base station in response to the data transmission. The ACK/NACK is received in WWAN resources orthogonal to the peer-to-peer resources. The apparatus 100 may further include means for sending a transmit request to the base station. The apparatus 100 may further include means for abstaining from sending the data transmission when a transmit request response signal is not received from the base station. The aforementioned means is the processing system 114 configured to perform the functions recited by the aforementioned means.

In another configuration, the apparatus 100 is a base station and includes means for receiving a scheduling control signal in peer-to-peer resources, means for determining whether to yield a data transmission based on the received scheduling control signal, and means for sending the data transmission to a wireless device on the peer-to-peer resources upon determining not to yield the data transmission. The apparatus 100 may further include means for sending a DL grant to the wireless device on WWAN resources orthogonal to the peer-to-peer resources. The DL grant indicates that the data transmission can be sent to the wireless device using the peer-to-peer resources. The apparatus 100 may further include means for receiving an ACK/NACK from the wireless device in response to the data transmission. The ACK/NACK is received in WWAN resources orthogonal to the peer-to-peer resources. The apparatus 100 may further include means for sending a transmit request to the wireless device. The apparatus 100 may further include means for abstaining from sending the data transmission when a transmit request response signal is not received from the wireless device. The aforementioned means is the processing system 114 configured to perform the functions recited by the aforementioned means.

In another configuration, the apparatus 100 is a wireless device and includes means for receiving a DL grant from a base station on WWAN resources orthogonal to peer-to-peer resources. The DL grant indicates that a data transmission can be sent to the wireless device using the peer-to-peer resources. The apparatus further includes means for receiving the data transmission from the base station on the peer-to-peer resources. The apparatus 100 may further include means for receiving a scheduling control signal in peer-to-peer resources and means for determining whether to yield a data transmission based on the received scheduling control signal. The apparatus 100 may further include means for sending an ACK/NACK to the base station in response to the data transmission. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of a wireless device, comprising:
    receiving an uplink grant from a base station on wireless wide area network resources orthogonal to peer-to-peer resources, the uplink grant indicating that a data transmission can be sent to the base station using the peer-to-peer resources;
    receiving a scheduling control signal in the peer-to-peer resources;
    determining, at the wireless device, whether to yield the data transmission based on the received scheduling control signal; and
    sending the data transmission to the base station on the peer-to-peer resources upon determining not to yield the data transmission.

2. The method of claim 1, further comprising receiving rate information for the data transmission on the wireless wide area network resources orthogonal to the peer-to-peer resources.

3. The method of claim 1, wherein the scheduling control signal comprises a transmit request response signal received from another wireless device other than the base station.

4. The method of claim 3, wherein the data transmission is yielded based on the transmit request response signal.

5. The method of claim 1, further comprising receiving an acknowledgment (ACK) or negative acknowledgment (NACK) from the base station in response to the data transmission, the ACK/NACK being received in wireless wide area network resources orthogonal to the peer-to-peer resources.

6. The method of claim 1, further comprising sending a transmit request to the base station.

7. The method of claim 6, further comprising abstaining from sending the data transmission when a transmit request response signal is not received from the base station.

8. The method of claim 6, wherein the data transmission is sent to the base station despite not receiving a transmit request response signal from the base station.

9. A method of a base station, comprising:
    sending a downlink grant to a wireless device on wireless wide area network resources orthogonal to peer-to-peer resources, the downlink grant indicating that a data transmission can be sent from the base station to the wireless device using the peer-to-peer resources;
    receiving a scheduling control signal in the peer-to-peer resources;
    determining whether to yield the data transmission based on the received scheduling control signal; and
    sending the data transmission from the base station to the wireless device on the peer-to-peer resources upon determining not to yield the data transmission.

10. The method of claim 9, wherein the downlink grant includes rate information for the data transmission on the peer-to-peer resources.

11. The method of claim 9, wherein the scheduling control signal comprises a transmit request response signal received from another wireless device other than said wireless device.

12. The method of claim 11, wherein the data transmission is yielded based on the transmit request response signal.

13. The method of claim 9, further comprising receiving an acknowledgment (ACK) or negative acknowledgment (NACK) from the wireless device in response to the data transmission, the ACK/NACK being received in wireless wide area network resources orthogonal to the peer-to-peer resources.

14. The method of claim 9, further comprising sending a transmit request to the wireless device.

15. The method of claim 14, further comprising abstaining from sending the data transmission when a transmit request response signal is not received from the wireless device.

16. The method of claim 14, wherein the data transmission is sent to the wireless device despite not receiving a transmit request response signal from the wireless device.

17. A wireless device, comprising:
    means for receiving an uplink grant from a base station on wireless wide area network resources orthogonal to peer-to-peer resources, the uplink grant indicating that a data transmission can be sent to the base station using the peer-to-peer resources;
    means for receiving a scheduling control signal in the peer-to-peer resources;
    means for determining, at the wireless device, whether to yield the data transmission based on the received scheduling control signal; and
    means for sending the data transmission to the base station on the peer-to-peer resources upon determining not to yield the data transmission.

18. The wireless device of claim 17, further comprising means for receiving rate information for the data transmission on the wireless wide area network resources orthogonal to the peer-to-peer resources.

19. The wireless device of claim 17, wherein the scheduling control signal comprises a transmit request response signal received from another wireless device other than the base station.

20. The wireless device of claim 19, wherein the data transmission is yielded based on the transmit request response signal.

21. The wireless device of claim 17, further comprising means for receiving an acknowledgment (ACK) or negative acknowledgment (NACK) from the base station in response to the data transmission, the ACK/NACK being received in wireless wide area network resources orthogonal to the peer-to-peer resources.

22. The wireless device of claim 17, further comprising means for sending a transmit request to the base station.

23. The wireless device of claim 22, further comprising means for abstaining from sending the data transmission when a transmit request response signal is not received from the base station.

24. The wireless device of claim 22, wherein the data transmission is sent to the base station despite not receiving a transmit request response signal from the base station.

25. A base station, comprising:
means for sending a downlink grant to a wireless device on wireless wide area network resources orthogonal to peer-to-peer resources, the downlink grant indicating that a data transmission can be sent from the base station to the wireless device using the peer-to-peer resources;
means for receiving a scheduling control signal in the peer-to-peer resources;
means for determining whether to yield the data transmission based on the received scheduling control signal; and
means for sending the data transmission from the base station to the wireless device on the peer-to-peer resources upon determining not to yield the data transmission.

26. The base station of claim 25, wherein the downlink grant includes rate information for the data transmission on the peer-to-peer resources.

27. The base station of claim 25, wherein the scheduling control signal comprises a transmit request response signal received from another wireless device other than said wireless device.

28. The base station of claim 27, wherein the data transmission is yielded based on the transmit request response signal.

29. The base station of claim 25, further comprising means for receiving an acknowledgment (ACK) or negative acknowledgment (NACK) from the wireless device in response to the data transmission, the ACK/NACK being received in wireless wide area network resources orthogonal to the peer-to-peer resources.

30. The base station of claim 25, further comprising means for sending a transmit request to the wireless device.

31. The base station of claim 30, further comprising means for abstaining from sending the data transmission when a transmit request response signal is not received from the wireless device.

32. The base station of claim 30, wherein the data transmission is sent to the wireless device despite not receiving a transmit request response signal from the wireless device.

33. A computer program product in a wireless device, comprising:
a non-transitory computer-readable medium comprising code for:
receiving an uplink grant from a base station on wireless wide area network resources orthogonal to peer-to-peer resources, the uplink grant indicating that a data transmission can be sent to the base station using the peer-to-peer resources;
receiving a scheduling control signal in the peer-to-peer resources;
determining, at the wireless device, whether to yield the data transmission based on the received scheduling control signal; and
sending the data transmission to the base station on the peer-to-peer resources upon determining not to yield the data transmission.

34. A computer program product in a base station, comprising:
a non-transitory computer-readable medium comprising code for:
sending a downlink grant to a wireless device on wireless wide area network resources orthogonal to peer-to-peer resources, the downlink grant indicating that a data transmission can be sent from the base station to the wireless device using the peer-to-peer resources;
receiving a scheduling control signal in the peer-to-peer resources;
determining whether to yield the data transmission based on the received scheduling control signal; and
sending the data transmission from the base station to the wireless device on the peer-to-peer resources upon determining not to yield the data transmission.

35. A wireless device, comprising:
a memory; and
a processor coupled to the memory and configured to:
receive an uplink grant from a base station on wireless wide area network resources orthogonal to peer-to-peer resources, the uplink grant indicating that a data transmission can be sent to the base station using the peer-to-peer resources;
receive a scheduling control signal in the peer-to-peer resources;
determine, at the wireless device, whether to yield the data transmission based on the received scheduling control signal; and
send the data transmission to the base station on the peer-to-peer resources upon determining not to yield the data transmission.

36. A base station, comprising:
a memory; and
a processor coupled to the memory and configured to:
send a downlink grant to a wireless device on wireless wide area network resources orthogonal to peer-to-peer resources, the downlink grant indicating that a data transmission can be sent from the base station to the wireless device using the peer-to-peer resources;
receive a scheduling control signal in the peer-to-peer resources;
determine whether to yield the data transmission based on the received scheduling control signal; and
send the data transmission from the base station to the wireless device on the peer-to-peer resources upon determining not to yield the data transmission.

37. A method of a wireless device, comprising:
receiving a downlink grant from a base station on wireless wide area network resources orthogonal to peer-to-peer resources, the downlink grant indicating that a data transmission can be sent from the base station to the wireless device using the peer-to-peer resources;
receiving a scheduling control signal in the peer-to-peer resources;

determining whether to yield the data transmission based on the received scheduling control signal; and receiving the data transmission from the base station on the peer-to-peer resources.

38. The method of claim 37, wherein the downlink grant includes rate information for the data transmission on the peer-to-peer resources.

39. The method of claim 37, wherein the data transmission is received from the base station on the peer-to-peer resources upon determining not to yield the data transmission.

40. The method of claim 39, wherein the scheduling control signal comprises a transmit request signal received from another wireless device other than the base station.

41. The method of claim 40, wherein the data transmission is yielded based on the transmit request signal.

42. The method of claim 37, further comprising sending an acknowledgment (ACK) or negative acknowledgment (NACK) to the base station in response to the data transmission, the ACK/NACK is sent in wireless wide area network resources orthogonal to the peer-to-peer resources.

43. A wireless device, comprising:
means for receiving a downlink grant from a base station on wireless wide area network resources orthogonal to peer-to-peer resources, the downlink grant indicating that a data transmission can be sent from the base station to the wireless device using the peer-to-peer resources;
means for receiving a scheduling control signal in the peer-to-peer resources;
means for determining whether to yield the data transmission based on the received scheduling control signal; and
means for receiving the data transmission from the base station on the peer-to-peer resources.

44. The wireless device of claim 43, wherein the downlink grant includes rate information for the data transmission on the peer-to-peer resources.

45. The wireless device of claim 43, wherein the data transmission is received from the base station on the peer-to-peer resources upon determining not to yield the data transmission.

46. The wireless device of claim 45, wherein the scheduling control signal comprises a transmit request signal received from another wireless device other than the base station.

47. The wireless device of claim 46, wherein the data transmission is yielded based on the transmit request signal.

48. The wireless device of claim 43, further comprising means for sending an acknowledgment (ACK) or negative acknowledgment (NACK) to the base station in response to the data transmission, the ACK/NACK is sent in wireless wide area network resources orthogonal to the peer-to-peer resources.

49. A wireless device, comprising:
a processing system configured to:
receive a downlink grant from a base station on wireless wide area network resources orthogonal to peer-to-peer resources, the downlink grant indicating that a data transmission can be sent from the base station to the wireless device using the peer-to-peer resources;
receive a scheduling control signal in the peer-to-peer resources;
determine whether to yield the data transmission based on the received scheduling control signal; and
receive the data transmission from the base station on the peer-to-peer resources.

50. A computer program product in a wireless device, comprising:
a non-transitory computer-readable medium comprising code for:
receiving a downlink grant from a base station on wireless wide area network resources orthogonal to peer-to-peer resources, the downlink grant indicating that a data transmission can be sent from the base station to the wireless device using the peer-to-peer resources;
receiving a scheduling control signal in the peer-to-peer resources;
determining whether to yield the data transmission based on the received scheduling control signal; and
receiving the data transmission from the base station on the peer-to-peer resources.

\* \* \* \* \*